United States Patent [19]

Mayo

[11] Patent Number: 4,537,069

[45] Date of Patent: Aug. 27, 1985

[54] DEVICE AND METHOD TO ENABLE DETECTION AND MEASUREMENT OF DEFORMITIES IN WELL COMPONENTS

[76] Inventor: John H. Mayo, 404 Alonda Dr., Lafayette, La. 70503

[21] Appl. No.: 619,828

[22] Filed: Jun. 12, 1984

[51] Int. Cl.$^3$ .......................... G01B 5/28; G01B 21/30
[52] U.S. Cl. .................................................. 73/432 R
[58] Field of Search .......... 73/432 G, 49.5 R, 40.5 R, 73/49.1, 49.8

[56] References Cited

U.S. PATENT DOCUMENTS 2,416,441  2/1947  Grant et al. ..................... 73/49.5 X

*Primary Examiner*—Stewart J. Levy
*Assistant Examiner*—Joseph W. Roskos
*Attorney, Agent, or Firm*—Kimmel, Crowell & Weaver

[57] ABSTRACT

A device for enabling the detection and measurement of wear deformities in well casings and similar well components is installed on a test and isolation tool in the space normally occupied by one of the tool test seal assemblies and possessing the exact configuration of such assembly. Instead of the resilient test seal element normally employed having elastic memory, a non-resilient material without significant elastic memory is used so that it will retain a deformed shape indicative of the shape and size of a wear deformity in a well component when the device is energized with fluid pressure applied to the test tool.

2 Claims, 5 Drawing Figures

U.S. Patent  Aug. 27, 1985  4,537,069
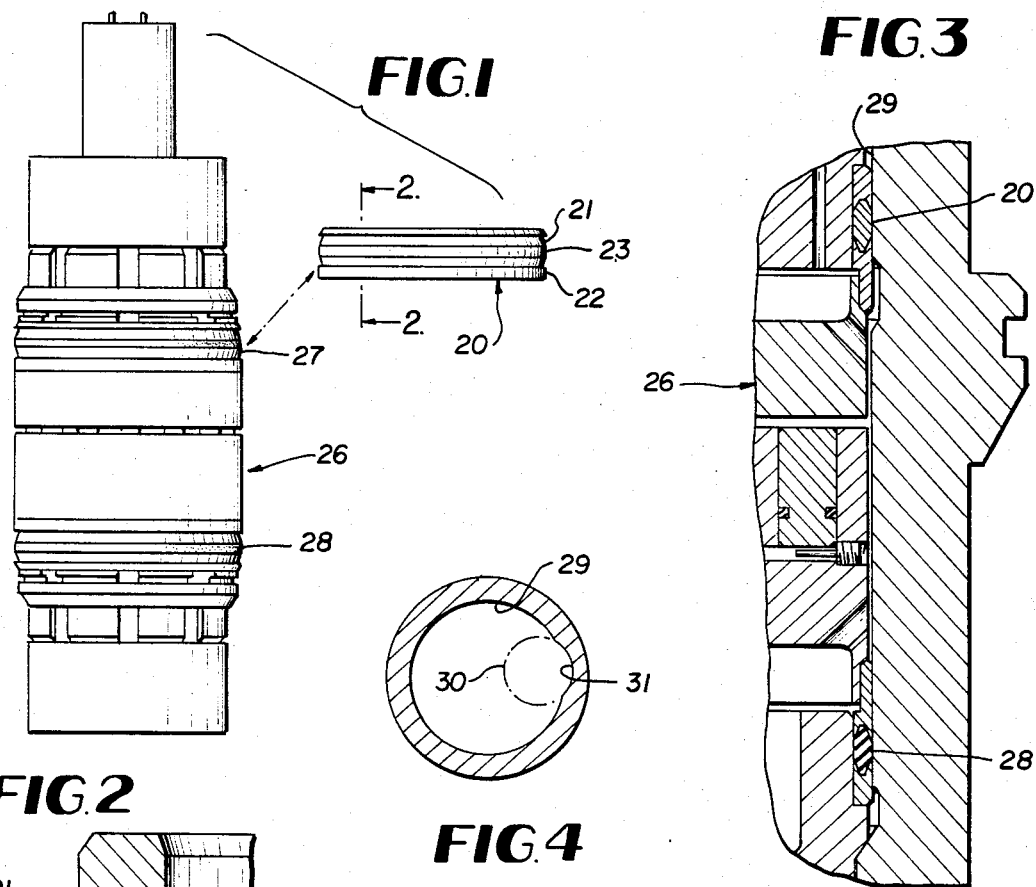
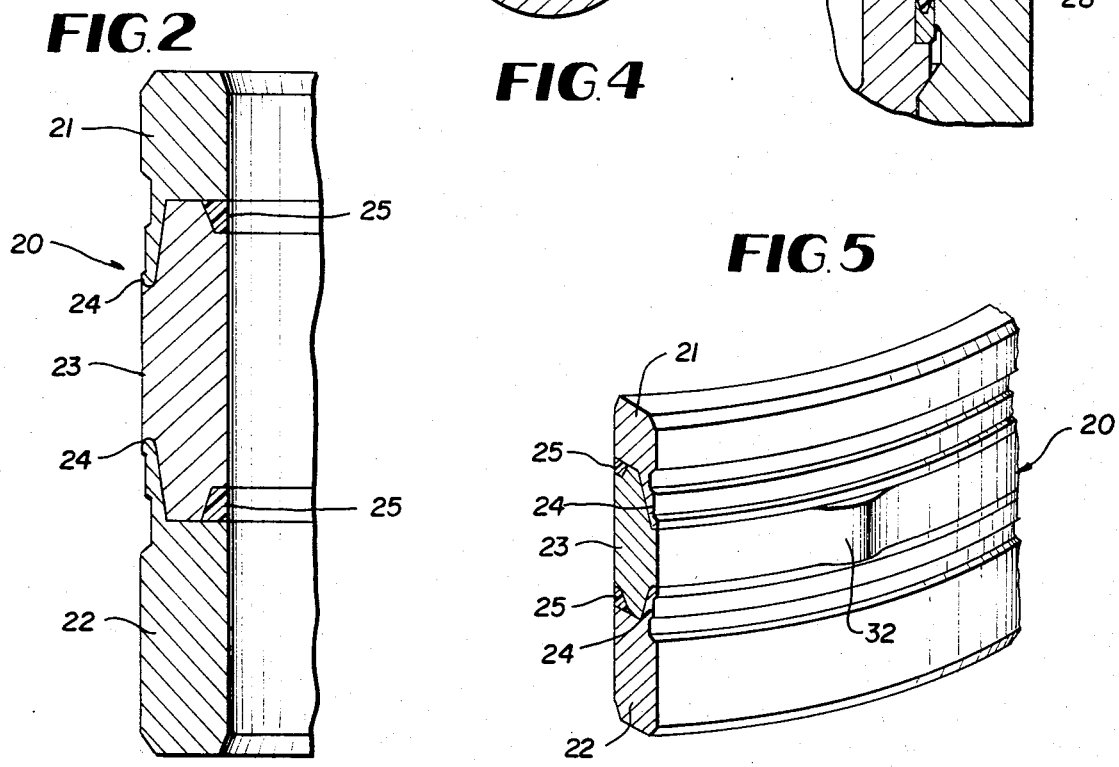

DEVICE AND METHOD TO ENABLE DETECTION AND MEASUREMENT OF DEFORMITIES IN WELL COMPONENTS

BACKGROUND OF THE INVENTION

This invention relates to a device for use in conjunction with a well test tool of the type disclosed in U.S. Pat. No. 4,373,380, and has for one of its objectives to increase the utility of the patented test tool.

In the patented test tool, an axially spaced pair of annular resilient rubber or rubber-like seals are held in metal containment rings to form unitized seal assemblies. The two resilient seals are first energized responsive to the application of energizing fluid pressure in the tool to compress them axially and thereby expand them radially into fluid sealing engagement with a sleeve in surrounding relationship to the test tool.

While so energized, the two seals are subjected to test pressure at a required magnitude delivered by pressurized test fluid in the tool on a different flow path.

When the test tool seals are de-energized following completion of a test, they return to their normal relaxed shapes due to their elastic memories. If the surrounding rigid sleeve component, such as a well head housing or well casing section, possesses a wear deformity, such as a groove or key seat in its bore caused by the action of drilling pipe or the like, the test seal assemblies on the patented tool will afford no indication or measurement of such wear deformity through the elastic seal element or the associated metal containment elements which may not be forced by fluid pressure into an adjacent wear deformity in the surrounding sleeve.

In accordance with the present invention, one of the test tool seal assemblies is removed from the tool and in its place the wear deformity detection and measurement device of this invention is installed. The device has the exact configuration of the removed seal assembly and occupies the same space on the test tool. In lieu of the resilient rubber-like test seal element, the device according to the invention has a contained element formed of lead or a similar alloy or non-metallic composition which lacks elasticity or resiliency and has virtually no elastic memory. This component is held in assembled relationship with substantially rigid containment rings designed to facilitate removal and replacement of the non-resilient lead or lead-like component following its use for detecting, locating and measuring an existing wear deformity, such as a groove in a surrounding casing or other sleeve.

When the assembly, according to the invention, while mounted on the test tool is energized by the application of fluid pressure, in the same manner that the resilient test seal is normally energized, the non-elastic lead or lead-like element will be forced by pressure to flow into the wear deformity of the surrounding rigid sleeve, and following removal of the tool from such sleeve, the non-resilient seal simulating element will retain on its exterior a permanent bulge or protrusion precisely indicative of the shape and size of the wear-induced groove or other recess in the surrounding rigid sleeve. The permanently deformed non-elastic detection and measuring element of the invention can have its deformity or protrusion precisely measured to reveal the condition of the worn surrounding sleeve, for the purpose of determining the future usefulness, if any, of such sleeve, whether a sub-sea well head housing, a well casing section or the like.

Other features and advantages of the invention will become apparent to those skilled in the art during the course of the following description.

BRIEF DESCRIPTION OF THE DRAWINGS

FIG. 1 is an exploded perspective view showing a detection and measurement device according to the invention in association with a well tool on which the device is used.

FIG. 2 is an enlarged fragmentary vertical section taken through the device on line 2—2 of FIG. 1.

FIG. 3 is a similar section through the device, the tool on which it is mounted and a surrounding well sleeve component.

FIG. 4 is a horizontal section through a well sleeve component showing an internal recess or groove therein caused by wear.

FIG. 5 is a fragmentary perspective view, partly in cross section, of the device for detecting and measuring deformities after being used for this purpose.

DETAILED DESCRIPTION

Referring to the drawings in detail wherein like numerals designate like parts, a device 20 for enabling detection and measurement of deformities caused by wear in well components, such as casing sections, comprises end metal containments 21 and 22 of ring form for an intermediate annular indicator element 23 formed of lead, an alloy similar to lead, or a non-metallic composition whose physical properties resemble lead. The material chosen for the element 23 should possess substantially no elastic memory so that when it becomes deformed during use in response to the application of fluid pressure, it will retain its altered shape in accordance with the essence of this invention.

The containment rings 21 and 22 for the indicator element 23 are substantially rigid and relatively non-deformable. They include exterior comparatively thin lips 24 which embrace the exterior of the element 23 so as to be flush therewith when the device is in a relaxed state. Preferably non-metallic detachable retainer rings 25 for the deformable indicator element 23 formed of fiberglass reinforced epoxy or the like are adhesively bonded to the rings 21 and 22 and embrace the interior end portions of the element 23 to secure it in assembled relationship with the containment rings 21 and 22.

Following the use of the device, resulting in an alteration of the shape of the non-elastic element 23, more or less permanently, the interior rings 25 can be removed to allow installation of a new indicator ring element 23 in the device to replace the one which has become misshapen during use.

As described in the introductory part of this application, the shape and size of the device 20 corresponds exactly to the shape and size of the test seal assemblies on the tool of U.S. Pat. No. 4,373,380. Such tool is shown at 26 in FIG. 1. The two regular elastic test seals on the tool 26 are indicated at 27 and 28.

In accordance with this invention, one test seal such as the seal 27 is bodily removed from the tool 26 and in its place the device 20 embodying the invention is installed on the tool 26.

Following such installation, the tool is run into the bore of a well casing 29, FIG. 3, or into any other sleeve component of the well requiring inspection for the presence of an internal deformity or deformities caused by wear. Such a wear deformity caused by the rubbing action of an off-center drilling pipe 30 is indicated at 31. It is required to discover the presence of the deformity 31 and its magnitude, to determine whether or not a dangerous condition exists in the well, which could result in a blow-out. These determinations are made by use of the device 20. After the tool 26, with the device 20 installed thereon, is properly placed in a casing section or other well component, seal energizing pressure is delivered to the tool exactly as described in Pat. No. 4,373,380. This energizing pressure will energize or activate the one elastic seal remaining on the tool 26 having an elastic memory. However, when the device 20 is subjected to energizing pressure applied axially to the non-elastic detector element 23 formed of lead or the like, this element as it expands radially outwardly will flow into any wear deformity 31 which is present in the surrounding casing or sleeve and fill the deformity, exactly matching the cross sectional shape thereof.

When seal activating pressure to the tool 26 is shut off allowing the one remaining elastic test seal on the tool to return to its normal relaxed state, through elastic memory, the deformed element 23 of the invention, not possessing elastic memory, will remain deformed and will have on its exterior a permanent protrusion 32 exactly matching the shape and size of the wear recess or deformity 31.

After the tool 26 is withdrawn from the well and brought back to the floor of the rig or other convenient location, the protrusion 32 is checked and carefully measured for shape and size by state of the art equipment. As a result of such measurements, it can be quickly determined if the casing deformity 31 is of a type to be dangerous, or is relatively harmless so that the casing or other well component can still be used.

In addition to detecting the presence of a wear-induced defect and its size and shape, the invention provides an indication of the location of the defect on the circumference of a casing or the like.

When the non-elastic indicator element 23 has served its purpose, it can be replaced in the device 20 by a new element 23 as previously described.

Following use of the device 20 on the test tool 26, the device can be removed from the tool and the regular elastic test seal assembly previously removed can be reinstalled, to return the test tool to its normal use state with two elastic seals thereon.

It may now be seen that the invention in a very simple and economical way significantly expands the range of utility of the patented test tool, without requiring any permanent reconstruction thereof. Furthermore, the invention as embodied in the device 20 solves a particularly important problem in the art which heretofore has not been dealt with successfully and has frequently been discovered only after costly damage to the well. The many advantages of the invention should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A device for detecting the existence and magnitude of wear-induced recesses in the bores of tubular well components comprising a body portion adapted to be positioned in a well adjacent to a tubular component of the well and within the bore of such component, an axially narrow ring element on and surrounding the body portion and being formed entirely of a non-elastic compliant and formable material, a pair of rigid containment rings for the ring element of compliant and formable material on and surrounding the body portion on opposite sides of said ring element coaxially therewith, said containment rings being recessed in their opposing end faces to receive and hold end portions of the ring element, the compliant and formable ring element having its exterior circumferential face freely disposed and unobstructed between said rigid containment rings, and means on the body portion to exert axial forces on the containment rings in opposite directions and causing compression and radial expansion of the compliant and formable ring element whereby the latter will enter any existing wear-induced recess in the bore of the adjacent tubular component of the well to indicate the existence and magnitude of such wear-induced recess following withdrawal of the body portion from the well.

2. A device for detecting the existence and magnitude of wear-induced recesses in the bores of tubular well components as defined in claim 1, and said ring element being formed of material possessing compliant and formable properties substantially similar to lead.

* * * * *